(12) United States Patent
Gallup et al.

(10) Patent No.: US 11,457,733 B2
(45) Date of Patent: Oct. 4, 2022

(54) BENDABLE STRAP WITH DETACHABLE ACCESSORY

(71) Applicants: Eric Gallup, Rochester Hills, MI (US); Jonathan Marks, Somerville, MA (US)

(72) Inventors: Eric Gallup, Rochester Hills, MI (US); Jonathan Marks, Somerville, MA (US)

(73) Assignee: Tech Dek Products LLC, Rochester Hills, MI (US)

( * ) Notice: Subject to any disclaimer, the term of this patent is extended or adjusted under 35 U.S.C. 154(b) by 0 days.

(21) Appl. No.: 16/273,634

(22) Filed: Feb. 12, 2019

(65) Prior Publication Data

US 2019/0174914 A1 Jun. 13, 2019

Related U.S. Application Data

(63) Continuation of application No. 14/675,013, filed on Mar. 31, 2015, now Pat. No. 10,244,862.

(Continued)

(51) Int. Cl.
*A47B 23/04* (2006.01)
*A45F 5/02* (2006.01)
*A45C 13/30* (2006.01)
*F16M 13/02* (2006.01)
*F16M 11/04* (2006.01)
*F16M 11/10* (2006.01)
*F16M 11/16* (2006.01)
*F16M 13/00* (2006.01)

(Continued)

(52) U.S. Cl.
CPC .......... *A47B 23/04* (2013.01); *A44B 11/2592* (2013.01); *A45C 13/30* (2013.01); *A45F 5/02* (2013.01); *A45F 5/021* (2013.01); *A47B 81/00* (2013.01); *A47G 1/16* (2013.01); *F16M 11/041* (2013.01); *F16M 11/10* (2013.01); *F16M 11/16* (2013.01); *F16M 13/00* (2013.01); *F16M 13/022* (2013.01); *A45C 2013/026* (2013.01); *A45F 2200/05* (2013.01); *A45F 2200/0516* (2013.01)

(58) Field of Classification Search
CPC .......... A45F 2200/05; A45F 2200/0516; A45F 5/02; A45F 5/021; A47B 23/04; A47B 81/00; A44V 11/2592; A45C 13/30; A45C 2200/05; A45C 13/22; A47G 1/16; F16M 11/041; F16M 11/10; F16M 11/16; F16M 11/40
See application file for complete search history.

(56) References Cited

U.S. PATENT DOCUMENTS 4,940,204 A * 7/1990 Nelson .................... F16M 11/10
248/688
5,568,549 A * 10/1996 Wang ..................... F16M 11/40
379/426

(Continued)

*Primary Examiner* — Christopher Garft
(74) *Attorney, Agent, or Firm* — Carlson, Gaskey & Olds, P.C.

(57) ABSTRACT

A bendable strap is disclosed which is configured to detachably couple with an accessory. The bendable strap includes a deformable support member covered by a flexible body. A coupling element is secured to the support member and cooperates with a complimentary coupling element disposed on an accessory such as a storage pouch, a tray, a hanger hook, a speaker enclosure, a flashlight, a picture frame, a message board, a bookstand, a beverage holder, or the like.

23 Claims, 14 Drawing Sheets

Related U.S. Application Data

(60) Provisional application No. 61/972,731, filed on Mar. 31, 2014.

(51) Int. Cl.
| | | |
|---|---|---|
| *A44B 11/25* | (2006.01) | |
| *A47B 81/00* | (2006.01) | |
| *A47G 1/16* | (2006.01) | |
| *A45C 13/02* | (2006.01) | |

(56) References Cited

U.S. PATENT DOCUMENTS

| | | | | |
|---|---|---|---|---|
| 7,533,860 | B2* | 5/2009 | Somuah | B60N 3/102 206/217 |
| 7,600,513 | B2* | 10/2009 | Gunaratnam | A61M 16/0683 24/615 |
| 8,979,060 | B1* | 3/2015 | Olsson | H04M 1/04 379/455 |
| 9,407,743 | B1* | 8/2016 | Hirshberg | H04B 1/385 |
| 2004/0029623 | A1* | 2/2004 | Ellis | A45F 5/00 455/575.8 |
| 2009/0008419 | A1* | 1/2009 | Tsang | A45F 5/02 224/271 |
| 2010/0258602 | A1* | 10/2010 | Amin | A45C 13/30 206/701 |
| 2011/0252607 | A1* | 10/2011 | Rothbaum | B65H 75/4473 24/303 |
| 2012/0080440 | A1* | 4/2012 | McClees | A45C 13/26 220/751 |
| 2014/0042294 | A1* | 2/2014 | Marzynski | A45F 5/00 248/693 |
| 2014/0326847 | A1* | 11/2014 | Barr | F16M 13/00 248/455 |
| 2015/0129724 | A1* | 5/2015 | Kohmoto | F16M 11/041 248/316.4 |
| 2015/0154891 | A1* | 6/2015 | Baschnagel | F16M 11/40 40/6 |
| 2016/0172883 | A1* | 6/2016 | Globerson | A45C 11/00 320/115 |
| 2020/0154868 | A1* | 5/2020 | Hines-Lucas | A45C 11/182 |

* cited by examiner

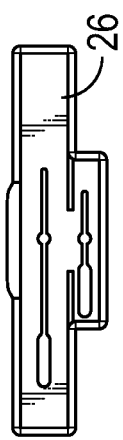
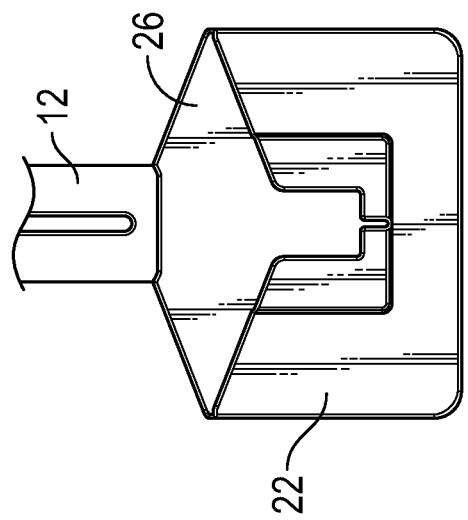
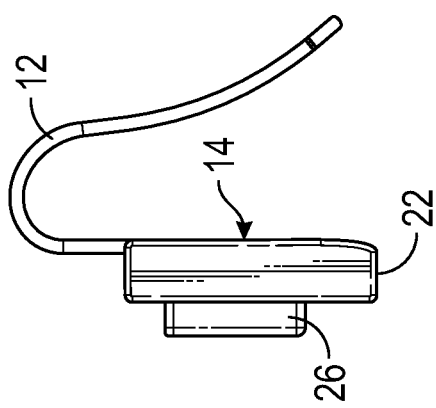
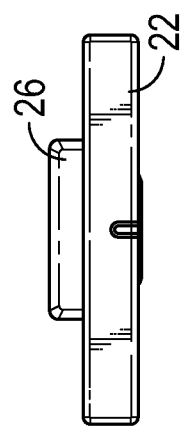
FIG. 14A  FIG. 14B  FIG. 14C  FIG. 14D
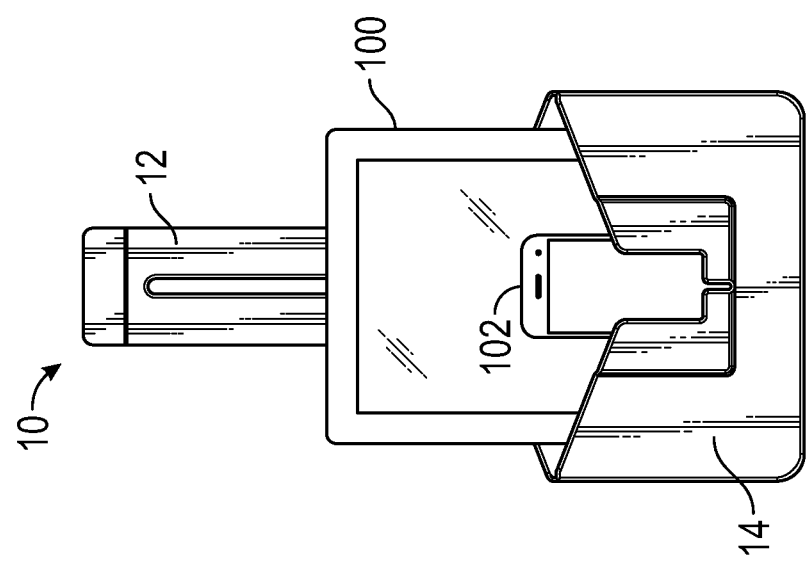
FIG. 13

US 11,457,733 B2

BENDABLE STRAP WITH DETACHABLE ACCESSORY

CROSS REFERENCED TO RELATED APPLICATION

This application is a continuation of U.S. application Ser. No. 14/675,013, filed Mar. 31, 2015, which claims priority to U.S. Provisional Application No. 61/972,731, filed Mar. 31, 2014.

TECHNICAL FIELD

The present disclosure relates generally to an apparatus for holding items, and more particularly a bendable strap with a fastener configured to attach and detach with an accessory such as a storage pouch for holding small consumer products, personal electronic devices, hand tools, and the like.

BACKGROUND

This section provides background information related to the present disclosure, which is not necessarily prior art.

The proliferation of personal electronic devices, such as mobile phones, tablets and laptop computers has resulted in an increased reliance on these devices. In fact, the reliance on these devices has reached the point where they must be nearby at every waking and sleeping moment of the day. Unfortunately, there is not always a convenient location to safely stow the personal electronic device. Often times these devices are placed precariously on a bedside, the arm of a chair, or a cluttered desktop. Alternately, these devices are hidden away in a pocket briefcase or purse.

In view of the recent desire to have such personal electronic devices readily at hand, there is a need to provide for a convenient and flexible storage solution. In this regard, it is desirable to have an accessory that is readily adaptable to the various form factor of the personal electronic devices. It is also important to have the ability to suitably secure the accessory to an adjacent structure so that the personal electronic device is within reach and stays put.

The system has utility beyond that of stowing personal electronic devices. For example, the system may be utilized for certain accessories or peripherals used in conjunction with personal electronic devices, or even further extended to other consumer products which benefit from being in close proximity to and easily accessible by the consumer/user.

BRIEF SUMMARY

In one aspect, an apparatus is disclosed for holding an accessory, which provides improved accessibility to the accessory or items stored therein. The apparatus includes a bendable strap having a deformable support member disposed within a flexible body. A coupling element extends from an end of the flexible body and is secured to an end of the deformable support member. The apparatus further includes an accessory having a coupling element that cooperates with the bendable strap by releasably engaging its coupling element such that the accessory is detachably secured to the bendable strap.

In another aspect, a bendable strap is disclosed. The bendable strap includes a U-shaped deformable support member having a pair of generally parallel legs interconnected at one end and a pair of free ends on an opposite end. A flexible body substantially covers the support member providing a relatively thin, generally rectangular form. A coupling element is disposed adjacent the flexible body and secured to the free ends of the support member.

BRIEF DESCRIPTION OF THE DRAWINGS

The drawings described herein are for illustrative purposes only of selected embodiments and not all possible implementations, and are not intended to limit the scope of the present disclosure.

FIG. 4A is a section view taken along line 4A-4A of FIG. 4;

FIG. 13 illustrates an intended use of the device shown in FIG. 10 holding a tablet and mobile phone;

FIGS. 14A-D illustrate a top plan, front elevation, bottom plan and side elevation of the device shown in FIG. 13;

Corresponding reference numerals indicate corresponding parts throughout the several views of the drawings.

DETAILED DESCRIPTION

Example embodiments will now be described more fully with reference to the accompanying drawings. There is no intention to be limited by any principle presented in the preceding background or the following detailed description.

Figure 1:
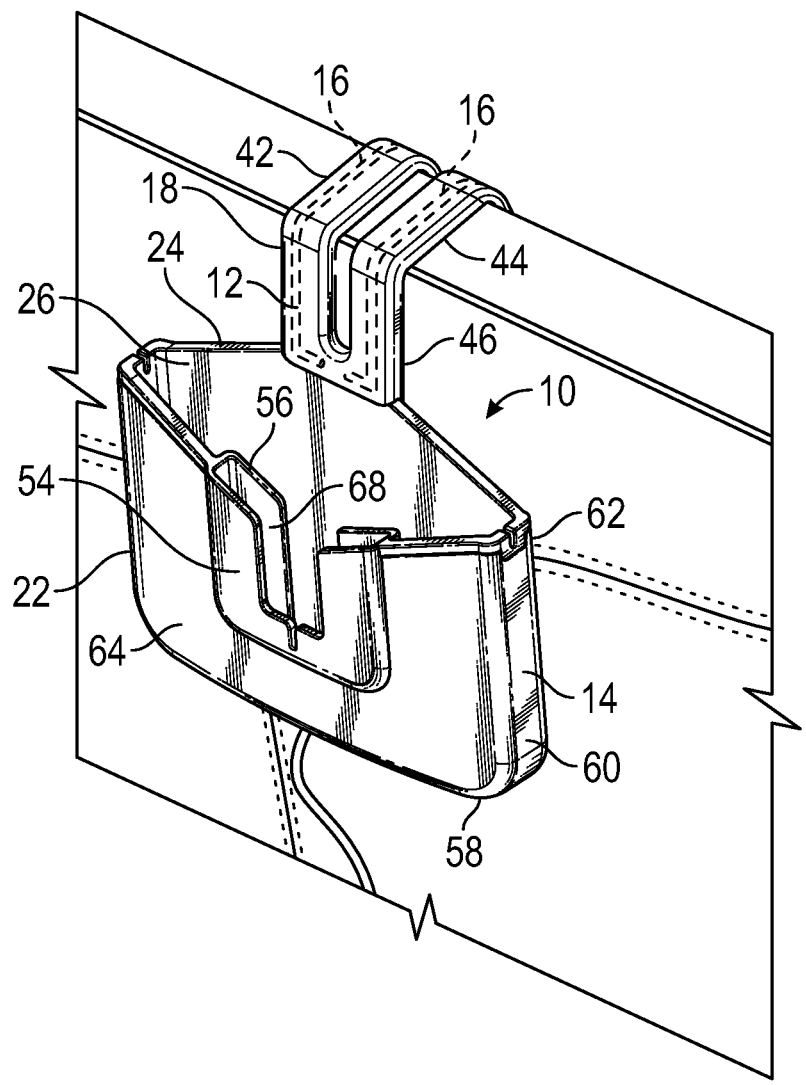
FIG. 1 illustrates a bendable strap wrapped over an arm of a couch and having a storage pocket detachably coupled thereto.

FIG. 1 illustrates an apparatus 10 according to a first embodiment is disclosed for holding accessory that provides improved accessibility to certain personal electronic devices such as mobile phone, tablets, laptop computers, personal music players, e-reading devices, remote controls and the like. The apparatus 10 includes a bendable strap 12 and an accessory or support pouch 14. The bendable strap 12 includes a deformable support member 16 disposed within a flexible body 18. The bendable strap 12 includes a first leg 42 and a second leg 44, each extending from a base portion 46. The base portion 46 of the bendable strap 12 is connected to the support pouch 14.

The support pouch 14 includes a rigid outer shell 22 supporting a second coupling element 24. A compliant insert 26 is disposed within an interior cavity formed by the outer shell 22 to provide the storage pouch 14 defining a storage space. As presently preferred, the outer shell 22 is made using a thermal formed or injection molded plastic which does not collapse or yield during normal and expected usage. As presently preferred, the insert 26 is made using a flexible rubber, silicon or polymeric material which can be easily installed and removed from the outer shell 22 and will not scratch or otherwise damage items stored therein. In this configuration, the apparatus 10 may be adorned with multiple colors to provide an aesthetically-pleasing, ornamental effect. For example, the insert 26 may be configured with a bright or bold color, while the outer shell 22 has a muted or darker tone, or vice versa given the apparatus 10 a contrasting look. The second coupling element 24 is configured to be detachably secured to the bendable strap 12.

The outer shell 22 includes a base wall 58, with side walls 60, a rear wall 62 and a front wall 64 extending upward therefrom. The front wall 64 is shown with an optional front window 66, opening upward. The insert 26 may include an outer pocket wall 54 spaced outward from an inner pocket wall 56 to define a front pocket 68 in the insert 26. A main pocket is defined behind the inner pocket wall 56, thus providing first and second storage spaces within the insert 26. When the insert 26 is received in the outer shell 22, the front pocket 68 is received in the front window 66. The outer pocket wall 54 of the insert 26 is positioned outward of the front wall 64 of the outer shell 22 in front of the front window 66.

Figure 2:
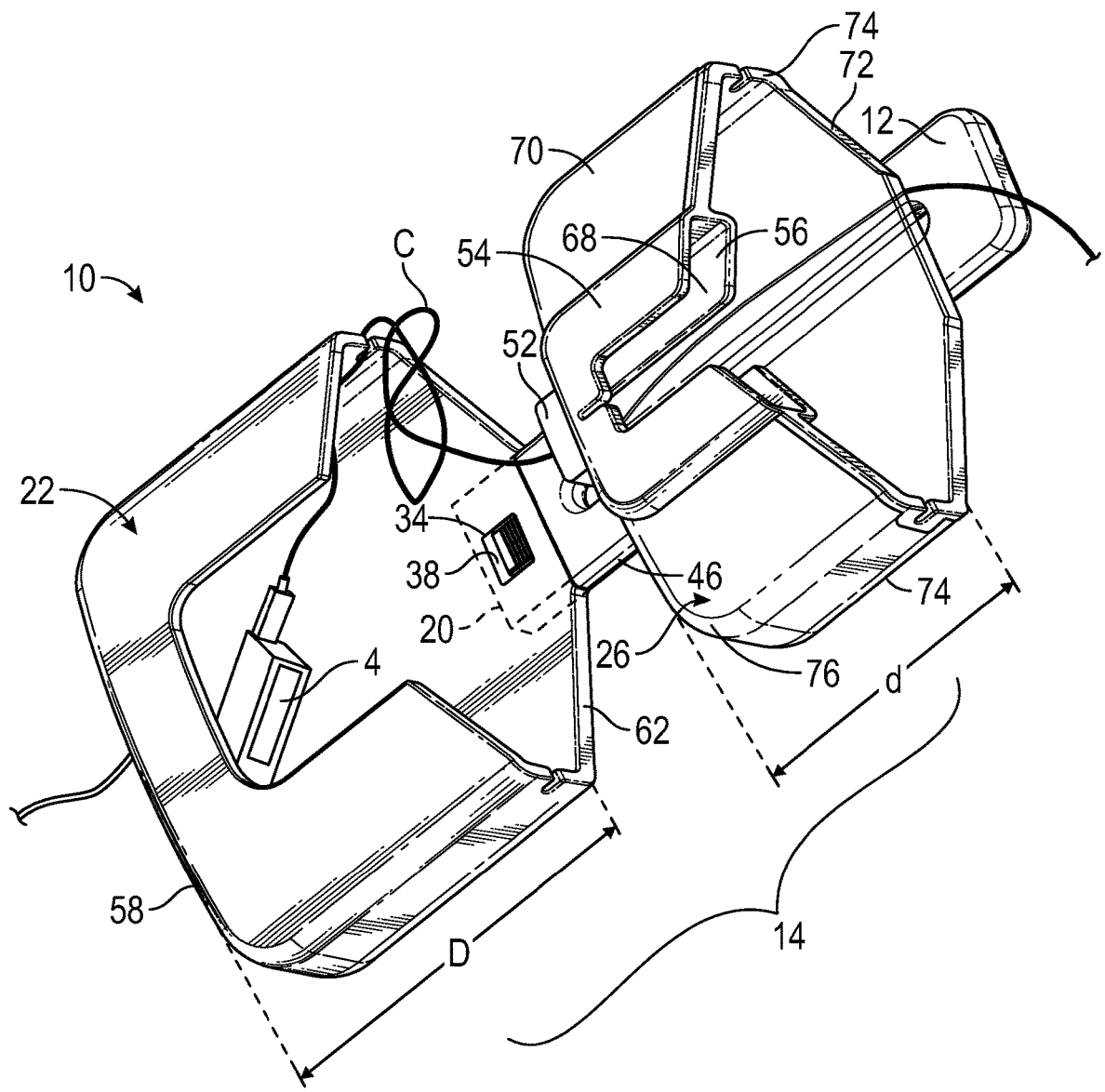
FIG. 2 illustrates the device shown in FIG. 1 in a partially exploded view.

FIG. 2 is a partially exploded view of the apparatus 10, showing the insert 26 removed from the outer shell 22. The depth (D) of the outer shell 22 is sufficiently greater than the depth (d) of the insert 26 so that when the insert 26 is placed within the outer shell 22, a void is created therebetween. The insert 26 may optionally have a foot or support column 52 projecting from a base portion 76 thereof. The foot 52 engages an inner surface of the base wall 58 of the outer shell 22, while the regions of the insert 26 lateral to the foot 52 would provide a storage space which may be used for housing a USB interface (U) or gathering excess cords (C) used with personal electronic devices. The insert 26 includes a front wall 70, a rear wall 72 and opposed side walls 74 extending upward from the base portion 76. The front pocket 68 is formed in the front wall 70 and opens upward.

A first coupling element 20 includes a latch 34 snap-fit into an opening 38 through an inner portion of the rear wall 62 of the outer shell 22.

Figure 3:
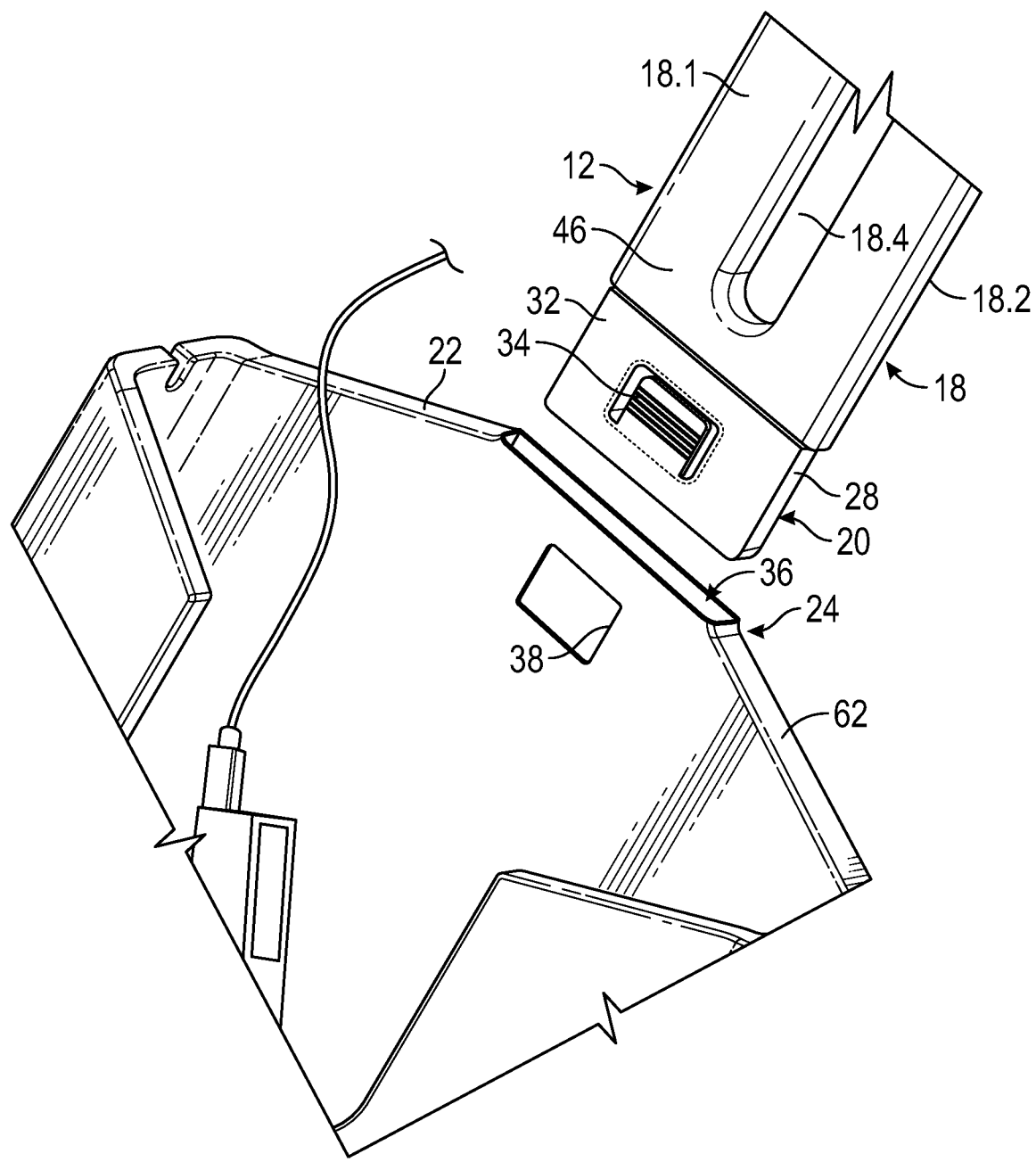
FIG. 3 illustrates the detachable coupling between a bendable strap and a storage pocket.

FIG. 3 shows the outer shell 22 detached from the bendable strap 12. The first coupling element 20 includes a tongue plate 28 secured to the base portion 46 of the deformable support member 16. The first coupling element 20 extends from an end of the flexible body 18 and is secured to an end of the deformable support member 16. The tongue plate 28 includes a tab 32 having a latch 34 extending from a face thereof.

Figure 5:
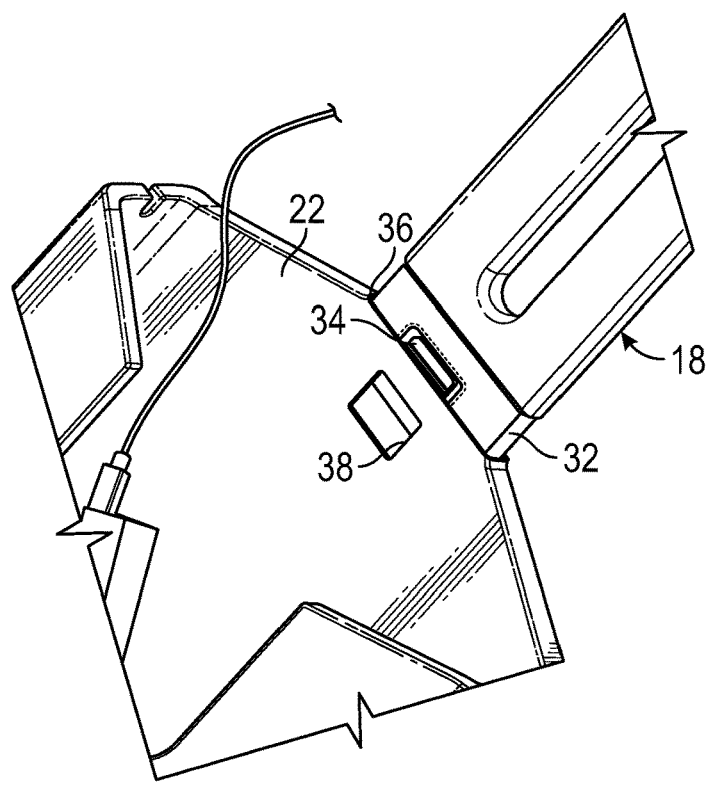
FIG. 5 illustrates the detachable coupling partially inserted into a slot formed in the storage pocket.
Figure 6:
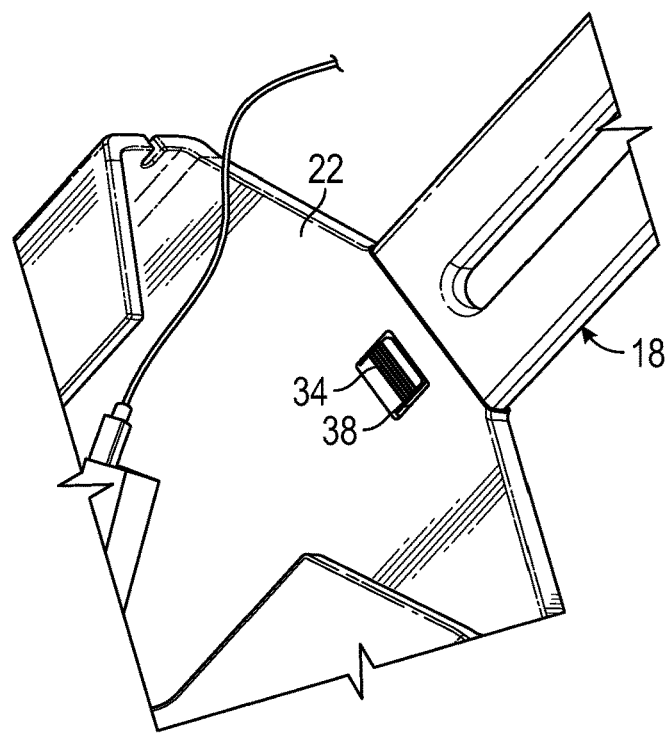
FIG. 6 illustrated the detachable coupling fully inserted into the slot formed in the storage pocket.

The second coupling element 24 in the outer shell 22 includes a socket 36 formed in the rear wall 62 of the outer shell 22. The socket 36 is configured to receive the tab 32 and has an opening 38 extending through an inner portion of the rear wall 62 into the socket 36. As the tab 32 is inserted into the socket 36 (FIG. 5), the latch 34 aligns with the opening 38. Once the tab 32 is fully inserted (FIG. 6), the latch 34 springs into the opening 38 for releasably securing the bendable strap 12 to the storage pouch 14. The tab 32 and socket 36 structure described herein provides an acceptable and presently preferred combination for the first and second coupling elements 20, 24. One skilled in the art will appreciate that other coupling elements which employ a different structure to releasably couple the bendable strap 12 with the storage pouch 14 may be used without departing from the spirit and scope of the apparatus 10 described herein.

Figure 4:
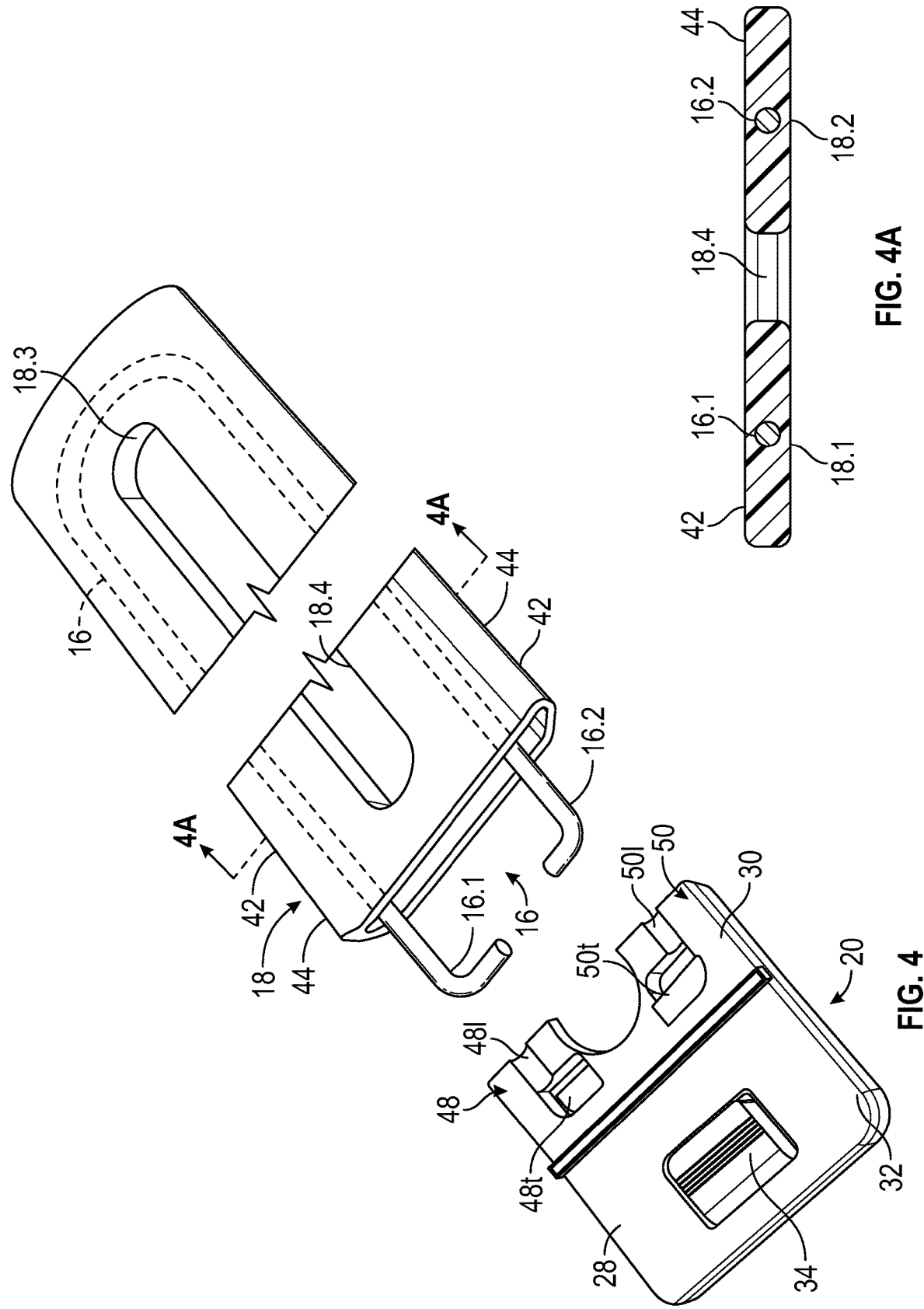
FIG. 4 illustrates the bendable strap and the detachable coupling shown in FIG. 3 in an exploded view.

With reference now to FIG. 4, the bendable strap 12 includes a deformable support member 16 in the form of a flexible, ductile wire or metal strip which can be plastically deformed by hand and will retain its new position. As presently preferred, the support member 16 is formed as a U-shaped member with a pair of legs 16.1, 16.2. A flexible body 18 covers the support member 16 to provide a relatively thin, generally rectangular structure. The flexible body 18 may be a polymer or may be a foam rubber. The support member 16 is deformable to a new shape and will keep its new shape, including keeping the flexible body 18 in the new shape. The bendable strap 12, and in particular the deformable support member 16, is secured to the first coupling element 20.

A first end 30 of tongue plate 28 has a pair of channels 48, 50 formed therein. As can be seen in FIG. 4, the channels 48, 50 have a longitudinal portion 48*l*, 50*l* and a transverse portion 48*t*, 50*t*. The ends of legs 16.1, 16.2 may be bent inward to provide a locking mechanical connection between the bendable strap 12 and the first coupling element 20. As presently preferred, the flexible body 18 is formed over the first end 30 of tongue plate 28 (FIG. 3) further securing the bendable strap 12 to the first coupling element 20. For example, the first end 30 of the tongue plate 28 may be insert-molded in the flexible body 18.

The deformable support member 16 includes the pair of legs 16.1, 16.2. In a preferred embodiment, the flexible body 18 has a first body portion 18.1 covering a first leg 16.1 and a second body portion 18.2 covering a second leg 16.2. The flexible body 18 further includes an end portion 18.3 interconnecting the first and second body portions 18.1, 18.2 and covering the end of the U-shaped deformable support member 16. The flexible body 18 defines a slot 18.4 between the first and second body portions 18.1, 18.2. In this configuration, the bendable strap 12 can be hung on a support structure. For example, a door knob can be inserted into the slot 18.4 so that the apparatus 10 hangs on the door knob.

Figure 7:
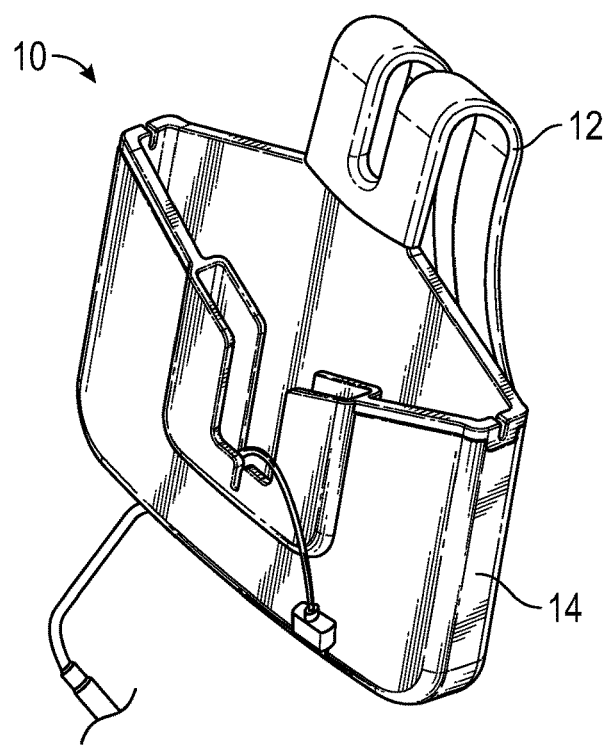
FIG. 7 illustrates a bendable strap formed into a support leg and a storage pocket detachably coupled thereto from a front perspective.
Figure 8:
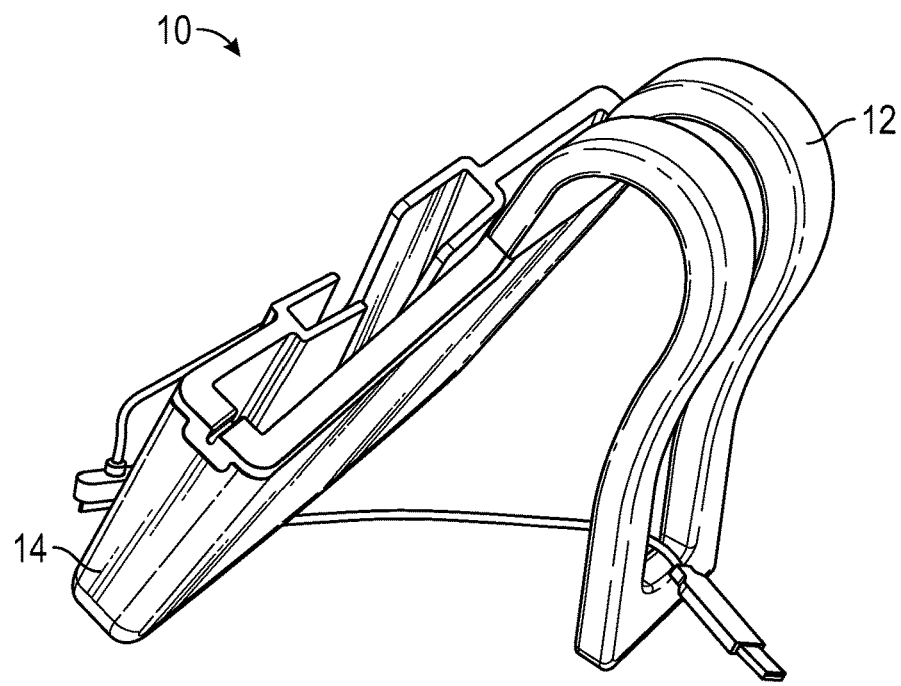
FIG. 8 illustrates the device shown in FIG. 7 from a side perspective.
Figure 9:
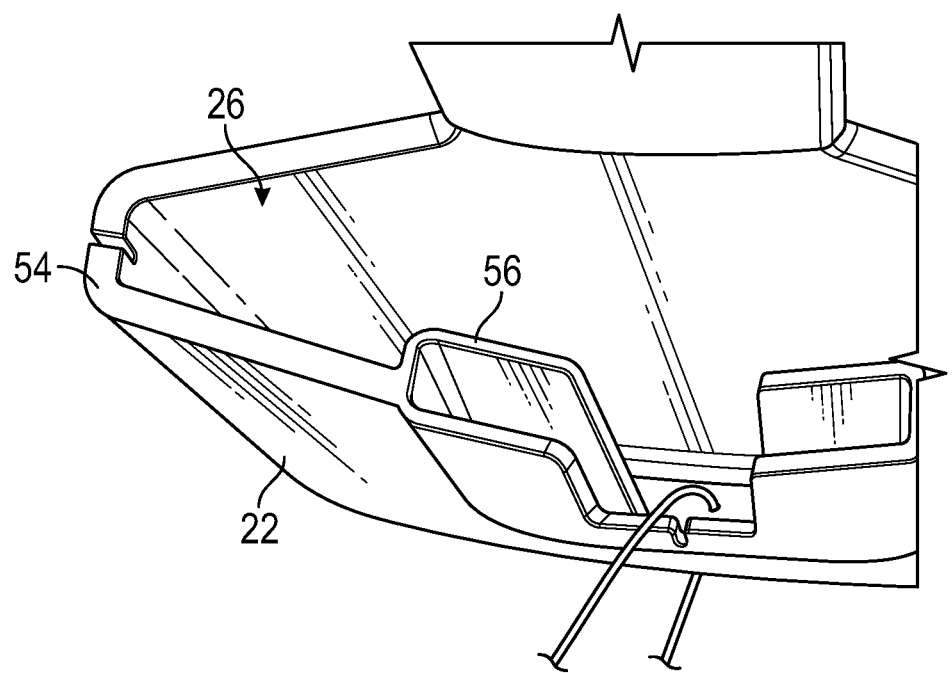
FIG. 9 illustrates a cord management feature of a storage pocket for a mobile phone and/or a tablet.
Figure 12:
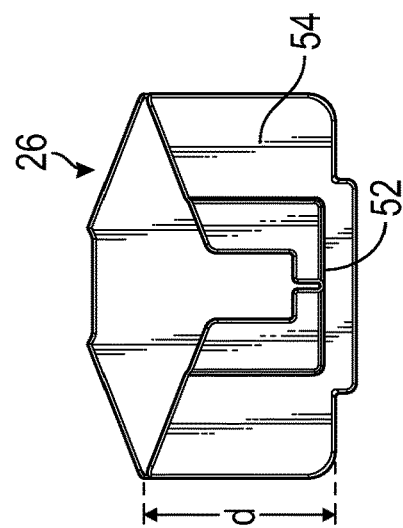
FIG. 12 illustrates an insert of the device shown in FIG. 10.
Figure 11:
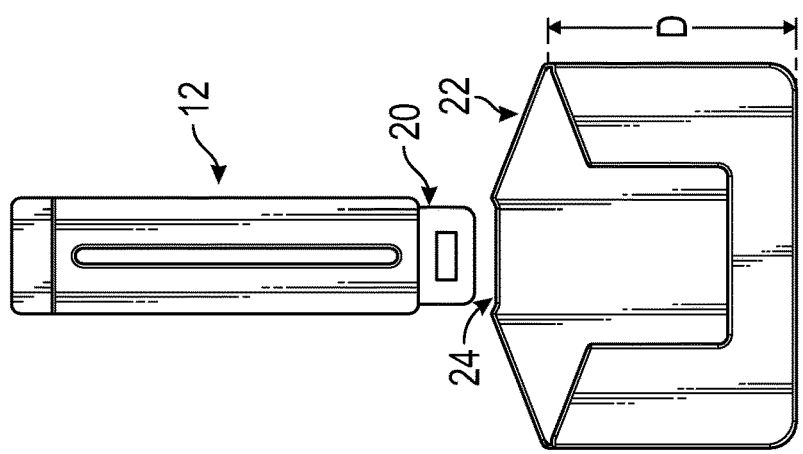
FIG. 11 illustrates a bendable strap and shell of the device shown in FIG. 10.
Figure 10:
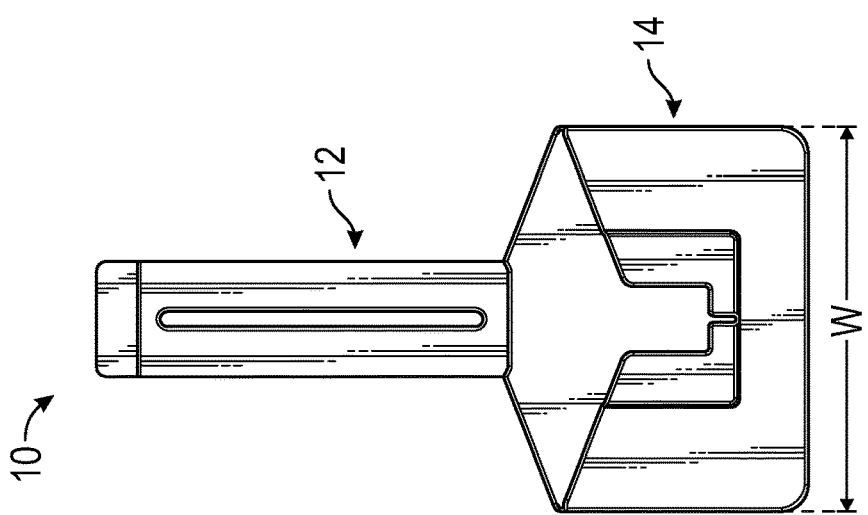
FIG. 10 illustrates an alternate embodiment of the device shown in FIG. 1.

With reference now to FIGS. 7-9, the apparatus 10 is configured with a cord retention system defined by the relative shape, orientation and location of passages through the outer shell 22 and insert 26. For example as illustrated in FIG. 14A, the outer shell 22 has a narrow slot centrally located through the bottom wall thereof, whereas the insert 26 has an enlarged slot located laterally offset from the center line connected with a narrow slot to a central passage. The relative shape orientation and location of these features permit a cord to be inserted through the outer shell 22 and into the pocket formed by the insert 26. Once positioned inside the insert 26, the cord may be manipulated to the center where it is retained. While a specific shape, orientation and location are illustrated in drawings, one skilled in the art will recognize that other features are having a similar function may be adapted and used in accordance with the present disclosure.

As shown in FIG. 13, the apparatus 10 can be used to hold a tablet 100 in the main pocket and a mobile phone 102 in the front pocket 68.

Figure 16:
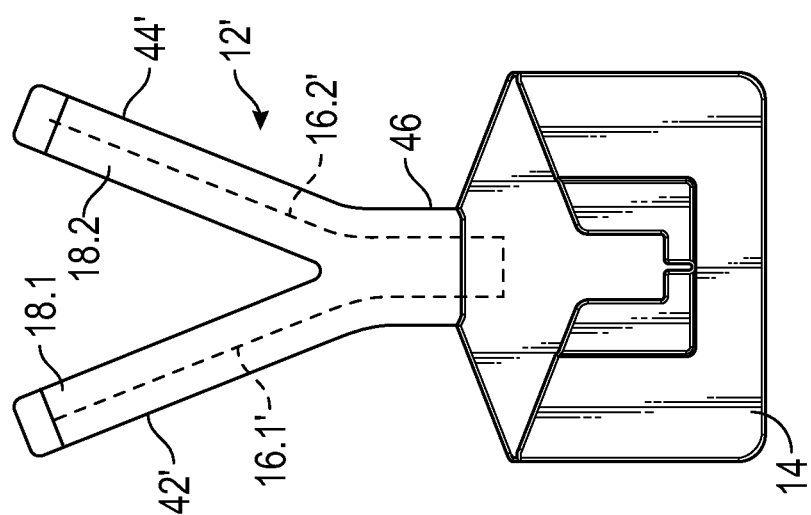
Figure 15:
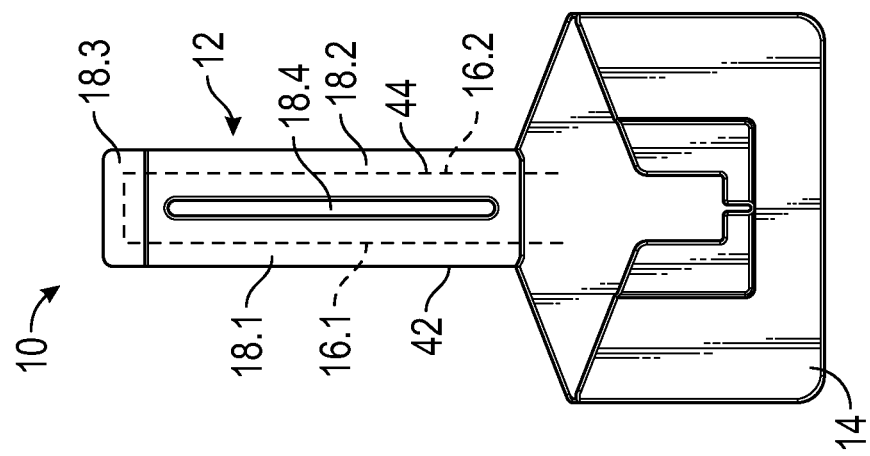

In FIG. 16, an alternate bendable strap 12' is shown connected to the storage pouch 14. The bendable strap 12' is otherwise the same as the bendable strap 12 of FIGS. 1-6 with the exception that the first leg 42' and second leg 44' are not connected to one another at far ends, but rather extend to free ends such that the first leg 42' and second leg 44' can be manipulated and plastically deformed independently of one another. The first leg 42' and second leg 44' extend at an acute angle (approximately 45 degrees) from the base portion 46'.

Figure 17:
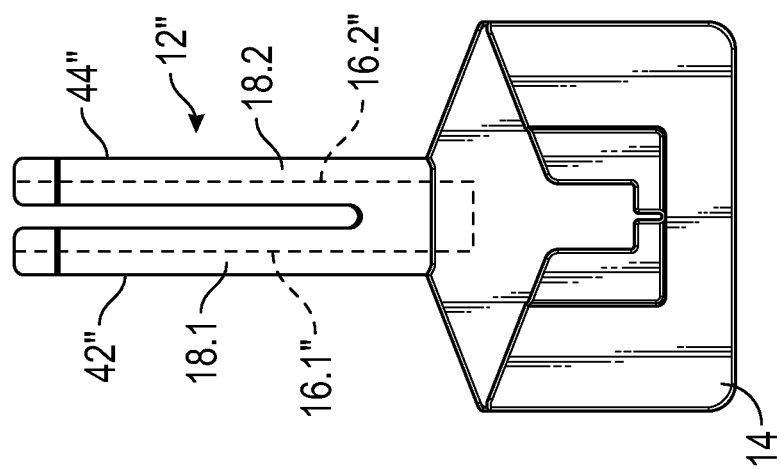
FIGS. 15-17 illustrate alternate embodiments for the bendable strap shown in FIG. 10.

A second alternate bendable strap 12" is shown in FIG. 17 connected to the storage pouch 14. The bendable strap 12" includes a first leg 42" and a second leg 44" extending generally parallel to one another from the base portion 46". Again the legs 42", 44" extend to free ends and may be manipulated plastically independently.

Figure 20:
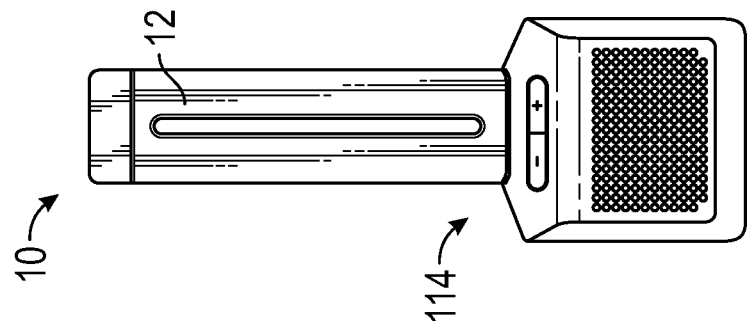
FIG. 20 illustrates a detachable accessory in the form of a speaker detachably coupled to the bendable strap.
Figure 19:
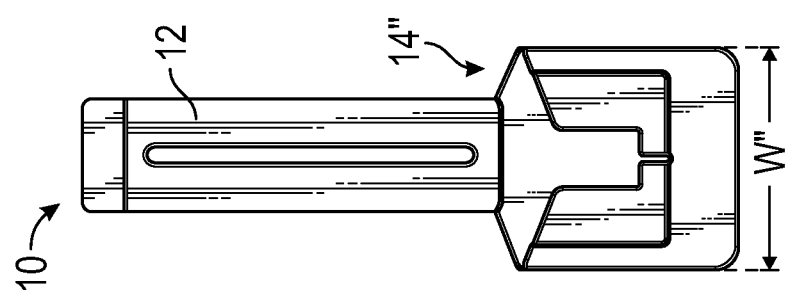
FIGS. 18-19 illustrate various dimensional configurations for the storage pocket shown in FIG. 10.
Figure 18:
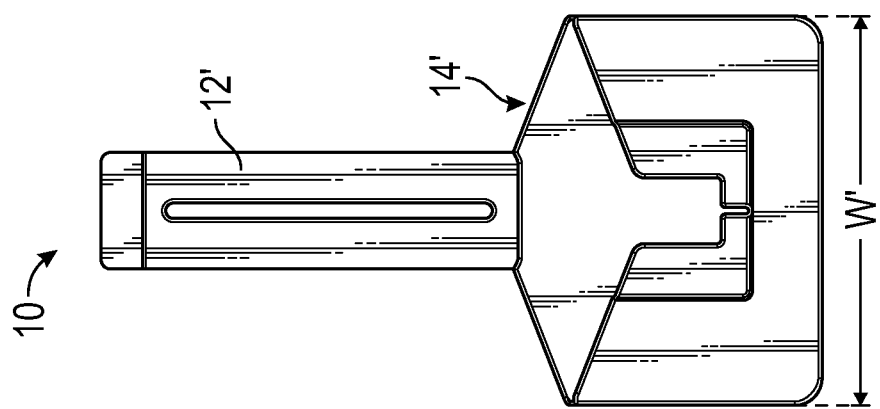

With reference now to FIGS. 8 through 20, it becomes apparent that the bendable strap 12 may be used with a variety of storage pouches or other accessories. For example as shown in FIGS. 18 and 19, the widths (W' and W") of storage pouch 14' and 14" vary with respect to the width (W) of storage pouch 14 to accommodate personal electronic devices of a different size. Similarly, as shown in FIG. 20, the accessory may be a personal-sized speaker 114 which has been substituted for the storage pouch illustrated in the previous figures. The speaker 114 could be a battery-powered, wireless (e.g. Bluetooth) speaker.

Figure 21:
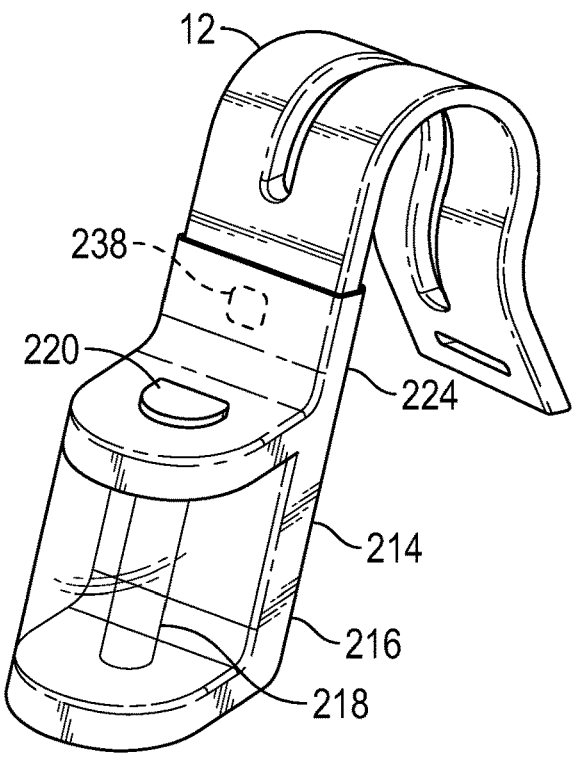
FIG. 21 illustrates a detachable accessory in the form of a lamp detachably coupled to the bendable strap.

FIG. 21 illustrates a detachable accessory in the form of a light or lamp 214 detachably coupled to the bendable strap 12. Note that in FIGS. 21-26, the latches connecting the bendable strap 12 to the accessories are facing rearwardly. The lamp 214 includes a housing 216 for a battery (or other power source) and the lighting element 218 (e.g., LED, incandescent, fluorescent, etc). A switch 220 at the top of the housing 216 selectively turns the lighting element 218 on and off. The housing 214 also includes a second coupling element 224 with an opening 238 for connecting to the bendable strap 12.

Figure 22:
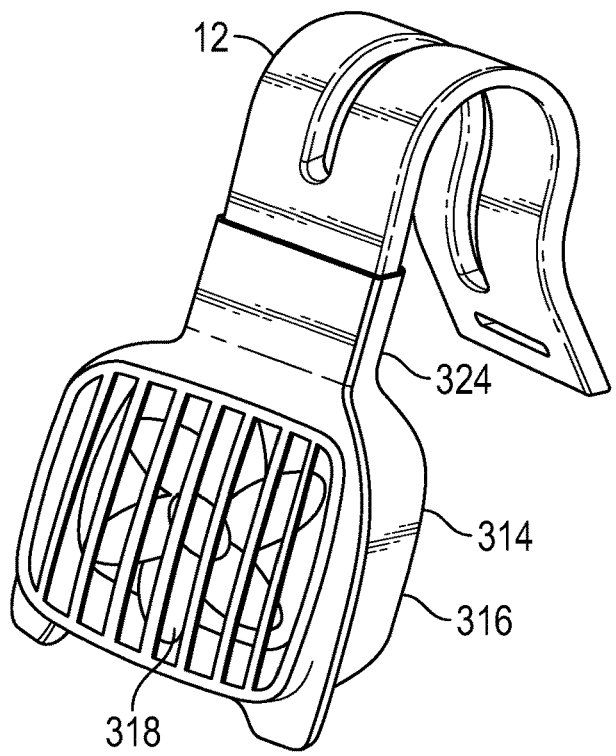
FIG. 22 illustrates a detachable accessory in the form of a fan detachably coupled to the bendable strap.

FIG. 22 illustrates a detachable accessory in the form of a fan 314 detachably coupled to the bendable strap 12. The fan 314 includes a housing 316 which contains a battery (or other power source), motor and fan 318. The housing 316 includes a second coupling element 324 for connecting to the bendable strap 12.

Figure 23:
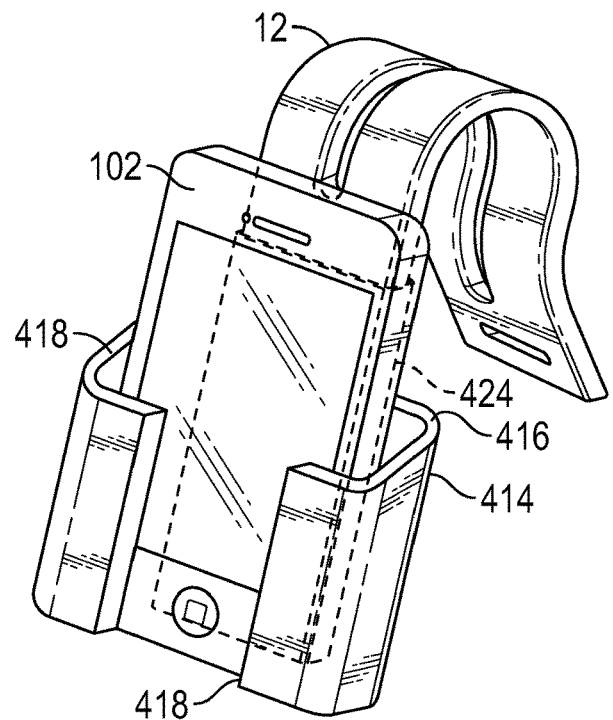
FIG. 23 illustrates a detachable accessory in the form of a phone holder detachably coupled to the bendable strap.

FIG. 23 illustrates a detachable accessory in the form of a phone holder 414 detachably coupled to the bendable strap 12. The phone holder 414 includes a rear portion 416 and a pair of opposed side grips 418. The side grips 418 are resiliently biased inward toward one another, such that any size phone 102 can be held between the side grips 418. A second coupling element 424 selectively connects to the bendable strap 12.

Figure 24:
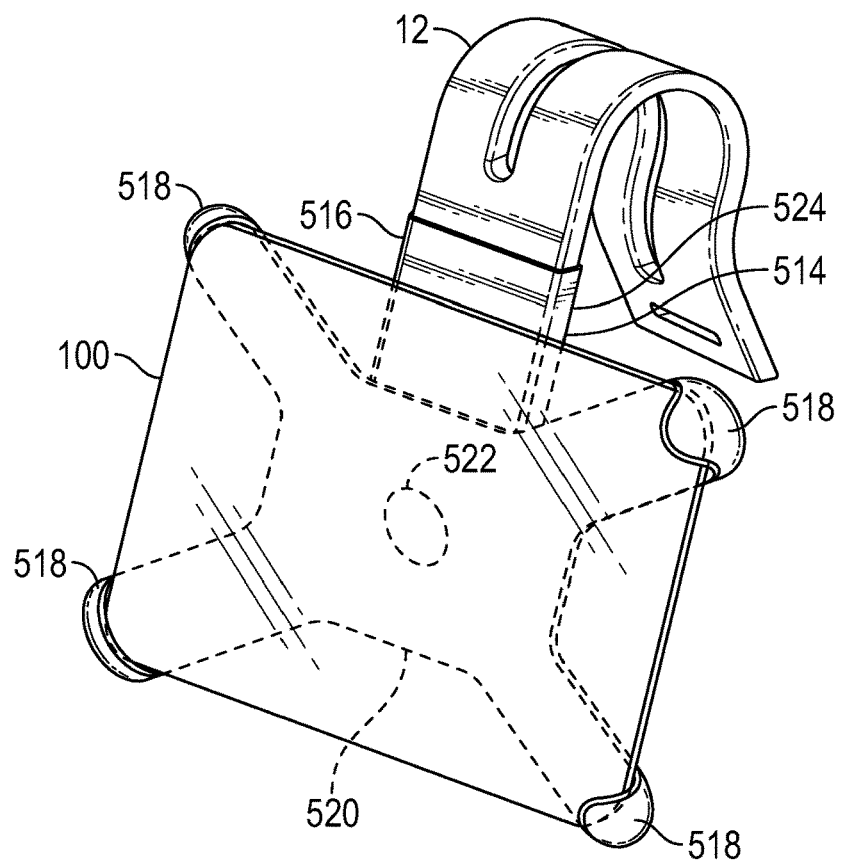
FIG. 24 illustrates a detachable accessory in the form of a tablet holder detachably coupled to the bendable strap.

FIG. 24 illustrates a detachable accessory in the form of a tablet holder 514 detachably coupled to the bendable strap 12. The table holder 514 includes a rear portion 516 having a second coupling element 524 for selectively coupling to the bendable strap 12. A resilient structure is connected to the rear portion 516, optionally via a pivot connection 522 so that the tablet 100 can be oriented portrait or landscape. The resilient structure includes a base portion 520 connected (optionally pivotably) to the rear portion 516. Four resilient arms 518 extend outward, forward and then inward toward one another to capture the corners of the table 100. The resilient arms 518 can capture tablets 100 of different sizes and hold them resiliently between them.

Figure 25:
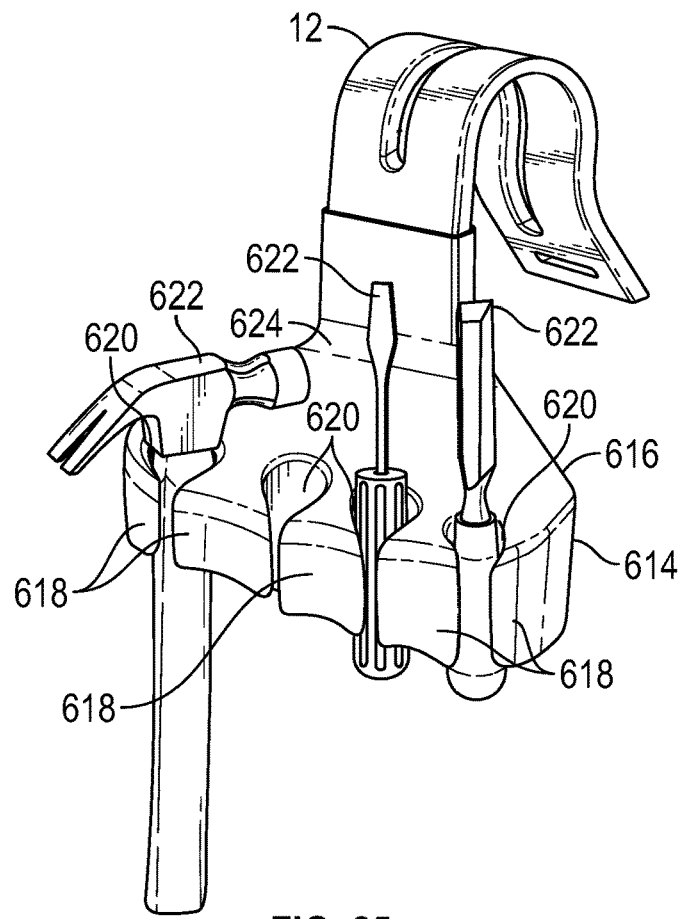
FIG. 25 illustrates a detachable accessory in the form of a tool holder detachably coupled to the bendable strap.

FIG. 25 illustrates a detachable accessory in the form of a tool holder 614 detachably coupled to the bendable strap 12. The tool holder 614 includes a base portion 616 having a second coupling element 624 for selectively attaching to the bendable strap 12. The tool holder 614 includes a plurality of fingers 618 projecting forward from the base portion 616. Each of the fingers 618 includes an enlarged outer end to create recesses 620 therebetween for receiving tools 622. The fingers 618 are formed of a resilient material to accommodate and retain tools 622 of different sizes.

Figure 26:
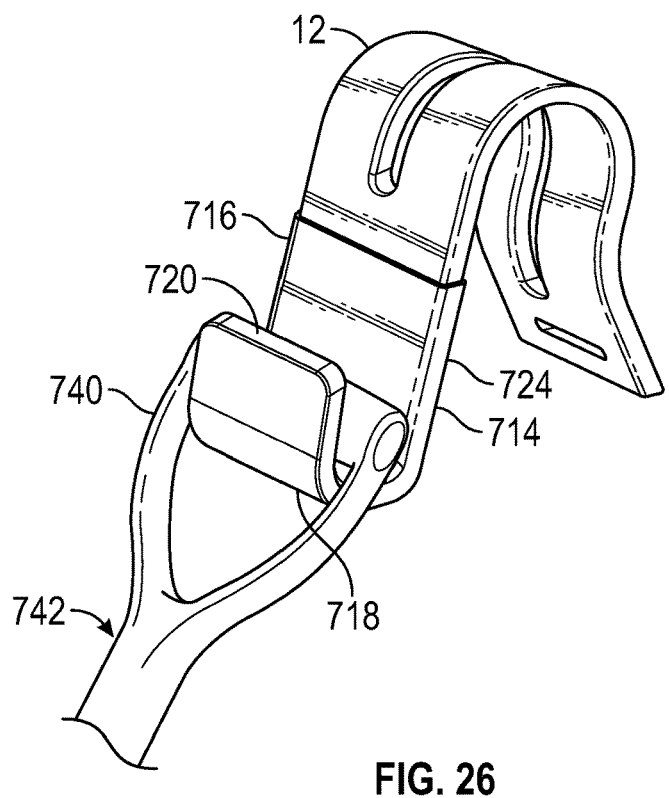
FIG. 26 illustrates a detachable accessory in the form of a hook detachably coupled to the bendable strap.

FIG. 26 illustrates a detachable accessory in the form of a hook 714 detachably coupled to the bendable strap 12. The hook 714 includes a rear portion 716 having a second coupling element 724 for selectively coupling to the bendable strap 12. A bottom wall 718 projects forward from the rear portion 716. A forward wall 720 projects upward from the bottom wall 718 to a free end to define a hook for supporting items, such as the handle 740 of a tool 742 (such as a shovel).

Generally, any of the accessories disclosed herein can be connected to any of the bendable straps. A user could have multiple straps and/or multiple accessories and interchange them as needed. The bendable straps can be used to hang or mount many different items in different places. For additional examples, the bendable strap can hang a cell phone from a car visor, seat belt or head rest. The speaker can be mounted to a computer monitor, a cabinet handle or shower curtain rod. The light can be mounted to a car hood (while working on the engine). It is further contemplated that the apparatus 10 may be readily adapted to use the bendable strap 12 with a variety of other accessories such as a tray, a flashlight, spotlight or floodlight, a picture frame, a message board, a book stand, a beverage holder, or the like.

While the present disclosure has focused on an apparatus for use with certain personal electronic devices, one skilled in the art will recognize that the apparatus could be readily adapted to additional product ideas. For example, the apparatus may be configured for use in a bathroom or shower to store shampoo and conditioner, razors, shave cream and/or a mirror. The flexible strap could be wrapped around the shower rod, the bathtub rim, or hung over the showerhead. The apparatus may be configured for use in a kitchen as a utensil holder which may be stood upright on the counter or hung over the edge of a cabinet countertop, or as a waste container which is hung on a drawer, counter edge or sink for collections of scraps while cooking, or as a cookbook stand. The apparatus may be configured for use in a workshop or garage to store tools, fasteners or other items used in projects around the house, or with a flashlight. The apparatus 10 could also include one or more accessories which are packaged as a kit configured for a particular intended purpose.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for holding an item with improved accessibility comprising:
a bendable strap having a deformable support member disposed within a flexible body, and a tongue plate extending from an end of the flexible body and having a first end secured to an end of the deformable support member and a second end forming a tab with a latch extending from a face thereof; and
a storage pouch including a base, the storage pouch further including a front wall, a rear wall opposite the front wall, and a pair of side walls between the front wall and the rear wall, the front wall, the rear wall and the pair of side walls extending upward from the base and defining an opening to the storage pouch opposite the base, the opening defined between the front wall, the rear wall, and the side walls, the rear wall having a socket formed therein, the socket configured to releasably engage the tongue plate by the tongue plate being moved into engagement with the socket in a direction generally parallel to the rear wall and toward the base such that the storage pouch is detachably secured to the bendable strap, wherein the rear wall includes an inner portion and an outer portion defining the socket therebetween, an opening through one of the inner portion and the outer portion, and wherein the tab of the tongue plate is receivable into the socket between the inner portion and the outer portion such that the latch would extend into the opening for detachably securing the storage pouch with the bendable strap.

2. The apparatus of claim 1 wherein the first end of the tongue plate has a channel formed therein which receives the end of the deformable support member.

3. The apparatus of claim 2 wherein the first end of the tongue plate is disposed within and concealed by the flexible body, and the second end of the tongue plate extends from the flexible body.

4. A apparatus for holding an item with improved accessibility comprising:
a bendable strap including:
a U-shaped deformable support member having two legs;
a flexible body substantially covering the support member; and
a first coupling element disposed adjacent the flexible body and secured to an end of the support member wherein the support member and the first coupling element form a closed loop; and
a storage pouch having a second coupling element operable to couple with the first coupling element, the storage pouch including a base, a front wall, a rear wall opposite the front wall, and a pair of side walls extending between the front wall and the rear wall, the front wall, the rear wall, and the side walls extending upward from the base, the storage pouch opening upward such that an opening to an interior of the storage pouch is defined between the front wall, the rear wall, and the side walls;
wherein the first coupling element is connectable to the second coupling element for detachably securing the bendable strap to the storage pouch wherein one of the first coupling element and the second coupling element includes a tongue plate, wherein the other of the first coupling element and the second coupling element includes a socket defined between an inner portion and an outer portion;
wherein the tongue plate is insertable into the socket in a direction generally parallel to the front, side and rear walls of the storage pouch such that as the tongue plate is inserted into the socket, a latch springs into an opening for detachably securing the bendable strap to the storage pouch.

5. The apparatus of claim 4 further comprising:
wherein the first coupling element includes the tongue plate, the tongue plate having a first end secured to the end of the deformable support member and a second end forming a tab with the latch extending from the face thereof; and
the socket formed in the storage pouch and configured to receive the tab, the socket having the opening formed therein;
wherein the tab is insertable into the socket in the direction generally parallel to the front, side and rear walls of the storage pouch such that the latch extends into the opening for detachably securing the bendable strap to the storage pouch.

6. An apparatus for holding an item comprising:
a bendable strap including:
a deformable support member, wherein the support member is U-shaped having two legs;
a flexible body substantially covering the support member to provide a structure with space between the legs; and
a tongue plate disposed adjacent the flexible body and secured to ends of the two legs of the support member, such that the tongue plate and the support member provide a closed loop; and
a storage pouch having a socket opening upward and operable to couple with the tongue plate, the storage pouch including a base and a plurality of walls extending upward from the base, the plurality of walls including a front wall, a rear wall opposite the front wall, and a pair of side walls between the front wall and the rear wall, the front wall, the rear wall and the pair of side walls defining an opening to the storage pouch opposite the base, the opening defined between the front wall, the rear wall, and the side walls, the rear wall including the socket formed therein;
wherein the tongue plate is connectable to the socket for detachably securing the bendable strap to the storage pouch.

7. The apparatus of claim 6 wherein the tongue plate has a first end secured to the end of the deformable support member and a second end forming a tab with a latch extending from a face thereof, wherein the tab is configured to insert into the socket such that the latch extends into an opening for detachably securing the bendable strap to the storage pouch.

8. The apparatus of claim 7 wherein the flexible body comprises a first body portion covering a first leg of the pair of legs of the deformable support member, and a second body portion covering a second leg of the pair of legs of the deformable support member, wherein there is space between first body portion and the second body portion.

9. The apparatus of claim 8 wherein the flexible body further comprises an end portion interconnecting the first and second body portions opposite the tongue plate.

10. The apparatus of claim 9 wherein the two legs of the deformable support member are generally parallel to one another.

11. The apparatus of claim 10 wherein the first end of the tongue plate has a pair of channels formed therein which receives the two legs of the deformable support member.

12. The apparatus of claim 11 wherein the first end of the tongue plate is disposed within and concealed by the flexible body, and the second end of the tongue plate extends from the flexible body.

13. The apparatus of claim 8 wherein the first body portion and the second body portion are each substantially wider in a plane containing the two legs than in a direction perpendicular to the plane containing the two legs.

14. The apparatus of claim 5 wherein the flexible body comprises a first body portion covering a first leg of the pair of legs of the deformable support member, and a second body portion covering a second leg of the pair of legs of the deformable support member, wherein there is space between the first body portion and the second body portion, wherein the first body portion and the second body portion are each substantially wider in a plane containing the two legs than in a direction perpendicular to the plane containing the two legs.

15. The apparatus of claim 1 wherein the front wall and the rear wall are substantially parallel to one another.

16. The apparatus of claim 6 wherein the rear wall includes an inner portion and an outer portion between which is defined the socket, wherein the inner portion partially defines an interior of the storage pouch.

17. The apparatus of claim 16 wherein the tongue plate is removably receivable in the socket such that the tongue plate would be parallel to the rear wall.

18. The apparatus of claim 14 wherein the space between the first body portion and the second body portion is a continuous elongated slot extending substantially an entire length of the first body portion and the second body portion.

19. The apparatus of claim 14 wherein the space between the first body portion and the second body portion is a continuous elongated slot extending parallel to longest dimensions of the first body portion and the second body portion.

20. The apparatus of claim 4 wherein the first coupling includes the tongue plate.

21. The apparatus of claim 4 wherein the tongue plate includes the latch.

22. The apparatus of claim 4 wherein the flexible body comprises a first body portion covering a first leg of the two legs of the deformable support member, and a second body portion covering a second leg of the two legs of the deformable support member, wherein there is space between the first body portion and the second body portion, wherein the first body portion and the second body portion are each substantially wider in a plane containing the two legs than in a direction perpendicular to the plane containing the two legs.

23. The apparatus of claim 22 wherein the space between the first body portion and the second body portion is a continuous elongated slot extending substantially an entire length of the first body portion and the second body portion.

* * * * *